(12) United States Patent
Semaan

(10) Patent No.: US 9,302,807 B1
(45) Date of Patent: Apr. 5, 2016

(54) WATER STORAGE FENCE ASSEMBLY

(71) Applicant: Sarkis Semaan, Victoria (AU)

(72) Inventor: Sarkis Semaan, Victoria (AU)

( * ) Notice: Subject to any disclaimer, the term of this patent is extended or adjusted under 35 U.S.C. 154(b) by 210 days.

(21) Appl. No.: 14/151,921

(22) Filed: Jan. 10, 2014

(51) Int. Cl.
*E04H 17/16* (2006.01)
*B65D 6/00* (2006.01)

(52) U.S. Cl.
CPC . *B65D 11/00* (2013.01); *B65D 7/12* (2013.01)

(58) Field of Classification Search
CPC .......... B65D 11/00; B65D 7/12; A01G 9/247; A01G 25/00; A01G 27/006; Y10T 137/479; Y10T 137/481; Y10T 137/86228; Y10T 137/262; Y10T 137/265; Y10T 137/576
USPC ............... 256/24, 73; 52/584.1, 590.1, 590.2, 52/464, 503; 220/4.12, 4.13, 4.16, 4.17, 220/4.26, 4.27; 137/262, 265, 576
See application file for complete search history.

(56) References Cited

U.S. PATENT DOCUMENTS

| | | | | |
|---|---|---|---|---|
| 1,422,674 A | * | 7/1922 | Cook ........................ | C02F 3/28 137/576 |
| 1,429,018 A | * | 9/1922 | Cibulas ..................... | E04D 3/08 52/464 |
| 3,457,698 A | * | 7/1969 | Albers ...................... | E04B 1/24 52/223.7 |
| 3,566,416 A | * | 3/1971 | Altieri ....................... | E03D 3/10 137/206 |
| 4,946,306 A | | 8/1990 | Yodock | |
| 4,989,386 A | * | 2/1991 | Collis ....................... | E04B 1/10 52/285.3 |
| D316,741 S | | 5/1991 | Kurth et al. | |
| 5,085,468 A | * | 2/1992 | Billotte .................... | F15B 1/26 280/831 |
| 5,149,224 A | * | 9/1992 | Smith .................. | E01F 15/088 256/13.1 |
| 5,443,324 A | * | 8/1995 | Sullivan ................ | E01F 15/088 404/6 |
| 5,522,944 A | * | 6/1996 | Elazari .................. | F24D 11/003 126/585 |
| 5,605,413 A | * | 2/1997 | Brown .................. | E01F 15/025 256/13.1 |
| 5,647,695 A | | 7/1997 | Hilfiker et al. | |
| 5,996,604 A | * | 12/1999 | Doelle ...................... | D21F 1/66 137/1 |
| 6,012,872 A | | 1/2000 | Perry et al. | |
| 6,032,426 A | * | 3/2000 | Tamlyn ................... | E04F 19/02 52/287.1 |
| 6,164,870 A | | 12/2000 | Baruh | |
| 6,341,445 B1 | | 1/2002 | Morrison | |
| 6,746,612 B2 | | 6/2004 | Hammond | |
| 6,767,158 B1 | * | 7/2004 | Consolazio ........... | E01F 15/088 404/6 |
| 6,848,857 B1 | * | 2/2005 | McColl ................. | E01F 15/088 404/6 |
| 7,165,626 B2 | | 1/2007 | Treddenick | |
| 7,226,236 B2 | * | 6/2007 | Mertens ................ | E01F 15/088 404/6 |
| 7,393,154 B1 | * | 7/2008 | Dyke ..................... | E01F 15/085 256/13.1 |
| 7,534,070 B1 | | 5/2009 | Urban | |
| 8,328,461 B2 | * | 12/2012 | Smith ................... | E01D 19/103 256/13.1 |
| 8,348,555 B2 | * | 1/2013 | Stoetzer ................. | E02D 5/185 405/282 |
| 8,474,195 B1 | * | 7/2013 | Anchondo ............... | E03B 3/03 405/284 |
| 8,476,522 B2 | * | 7/2013 | Schultz ...................... | F24J 2/22 136/248 |
| 2010/0127097 A1 | | 5/2010 | Frank | |
| 2011/0247323 A1 | * | 10/2011 | Kenway .................. | B60L 11/16 60/415 |
| 2011/0259402 A1 | * | 10/2011 | Schultz ...................... | F24J 2/00 136/248 |

FOREIGN PATENT DOCUMENTS

AT     WO9311310     *   6/1993   ............... E03B 3/03

* cited by examiner

*Primary Examiner* — Gregory Binda
*Assistant Examiner* — Nahid Amiri

(57) ABSTRACT

A water storage fence assembly collects and stores a fluid, such as water, therein. The assembly includes a plurality of panels coupled together to define a storage unit. An interior space of the storage unit is configured to receive a fluid therein. Each of the panels is in fluid communication with an adjacently positioned one of the panels such that the fluid positioned within the interior space of the storage unit flows freely between the panels.

15 Claims, 5 Drawing Sheets

WATER STORAGE FENCE ASSEMBLY

BACKGROUND OF THE DISCLOSURE

Field of the Disclosure

The disclosure relates to storage assemblies and more particularly pertains to a new storage assembly for collecting and storing a fluid, such as water, therein.

SUMMARY OF THE DISCLOSURE

An embodiment of the disclosure meets the needs presented above by generally comprising a plurality of panels coupled together to define a storage unit. An interior space of the storage unit is configured to receive a fluid therein. Each of the panels is in fluid communication with an adjacently positioned one of the panels such that the fluid positioned within the interior space of the storage unit flows freely between the panels.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
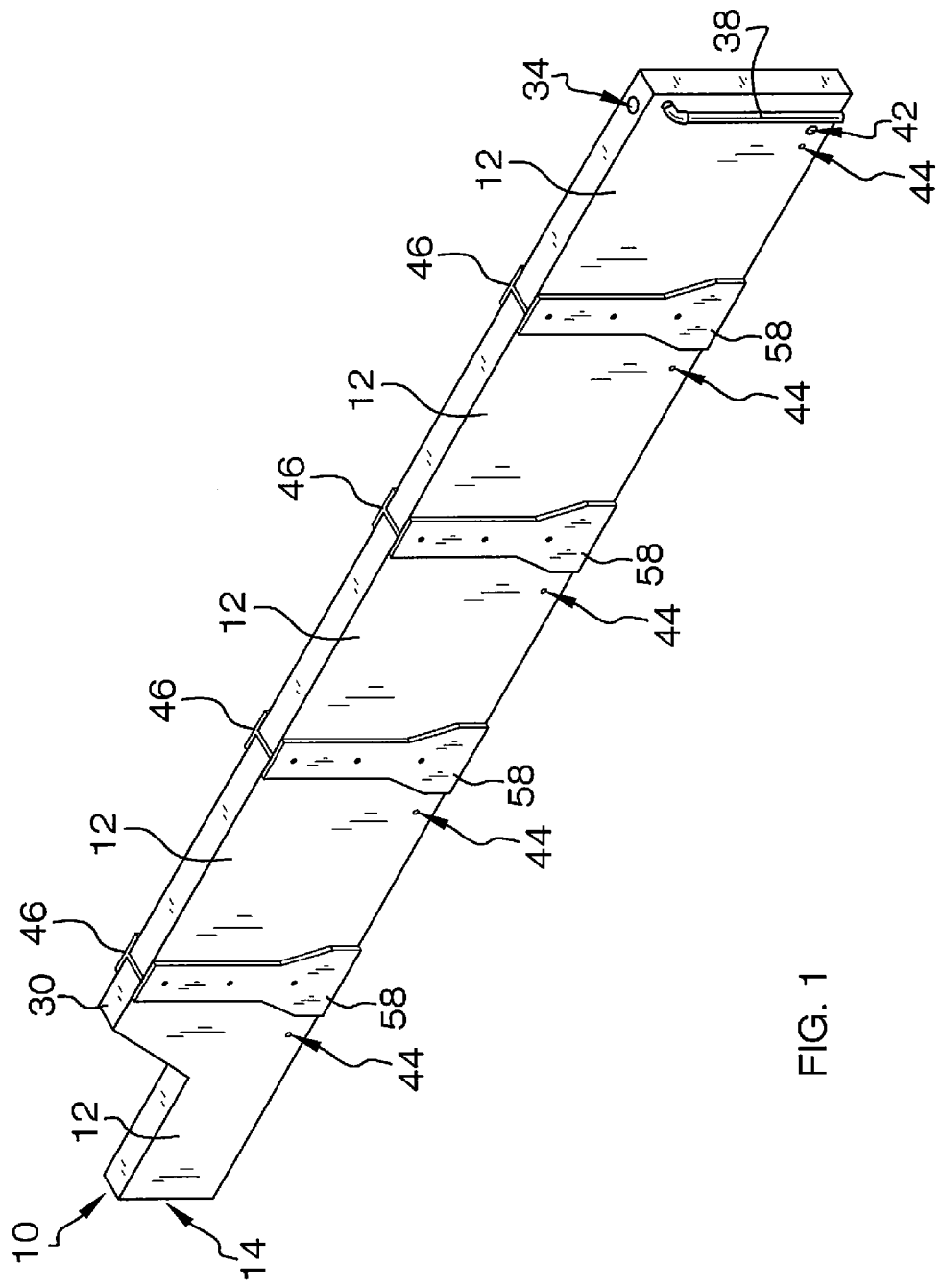
FIG. 1 is a top front side perspective view of a water storage fence assembly according to an embodiment of the disclosure.
Figure 2:
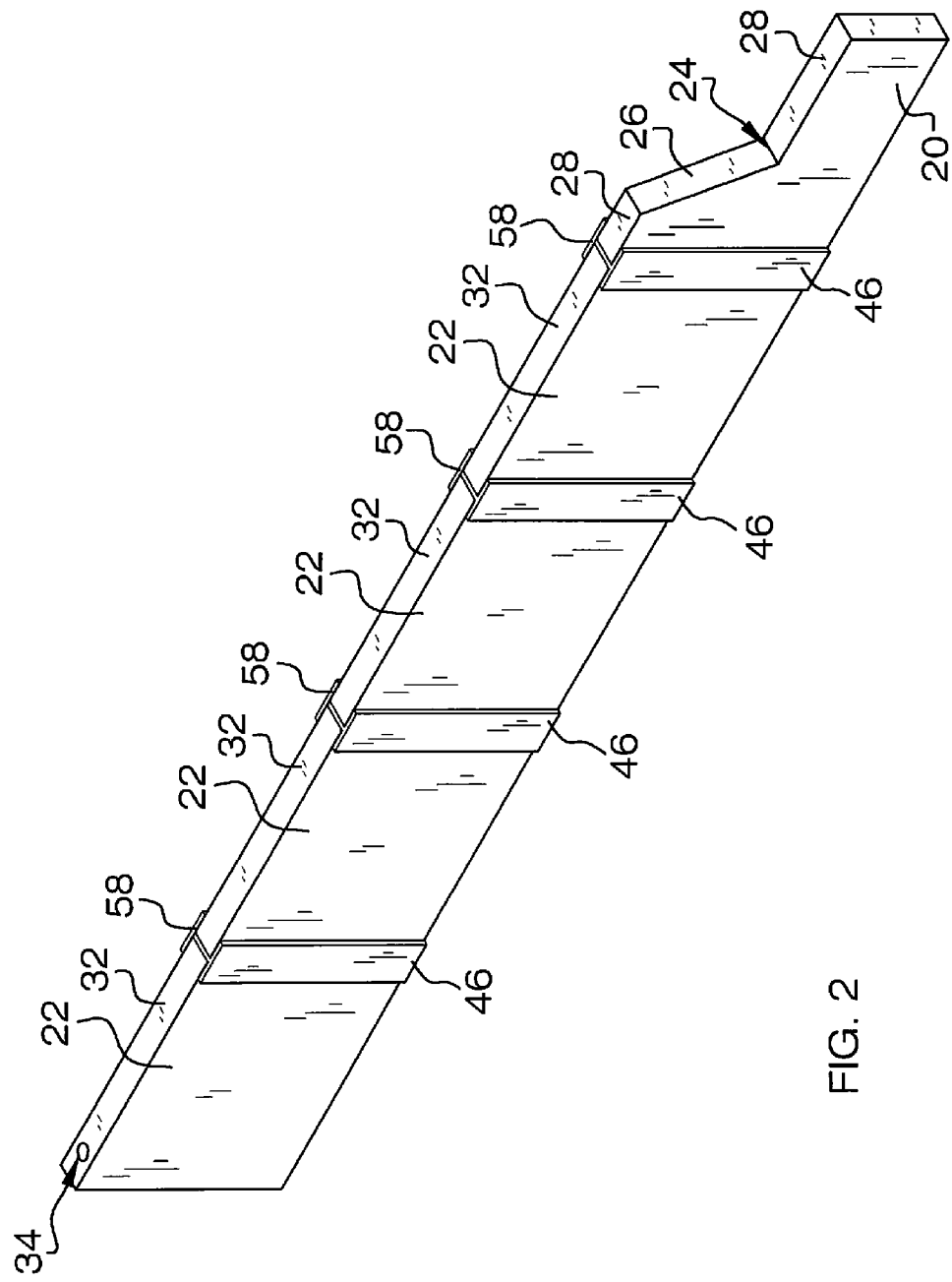
FIG. 2 is a top rear side perspective view of an embodiment of the disclosure.
Figure 3:
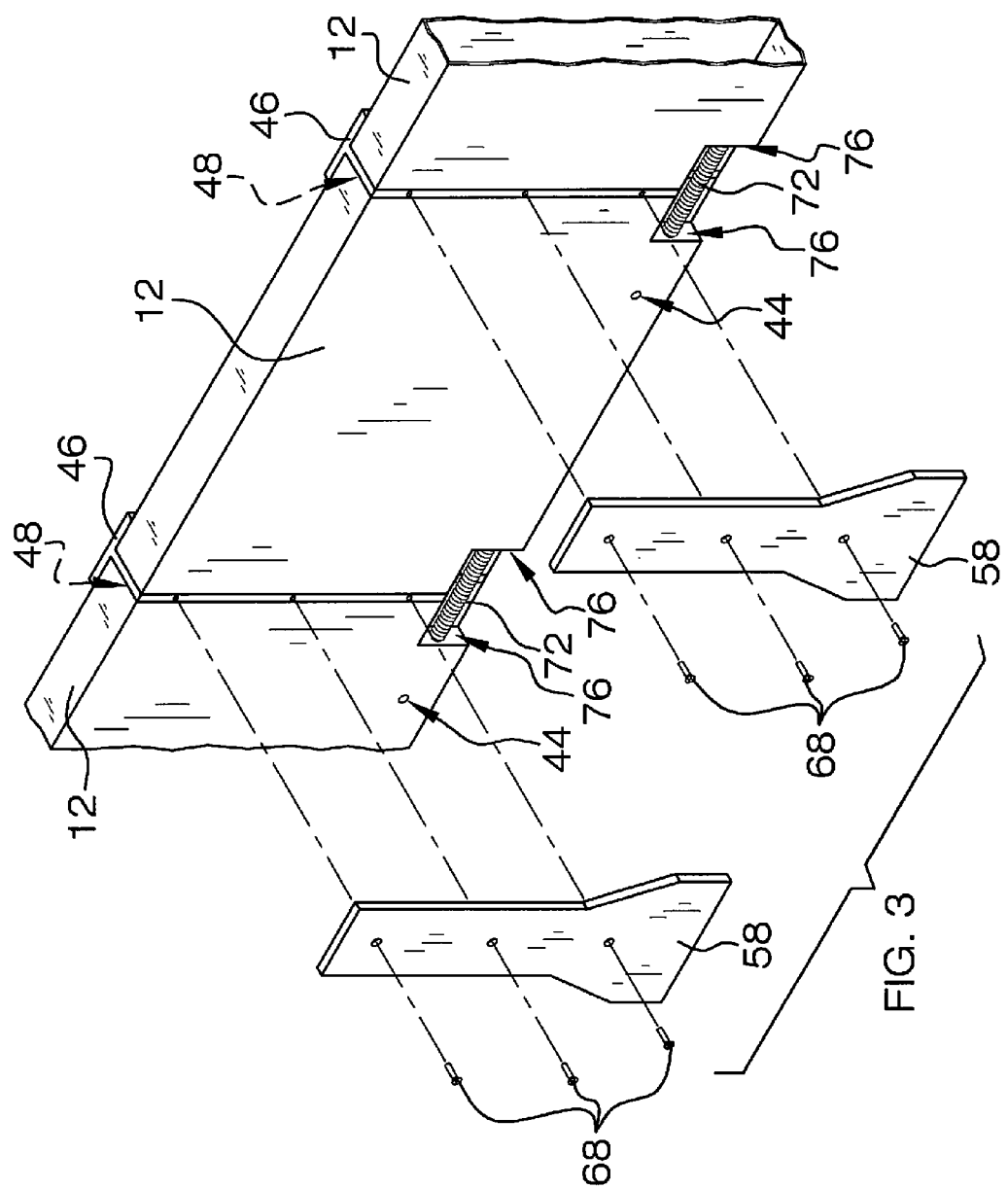
FIG. 3 is a partially-exploded top front side perspective view of an embodiment of the disclosure.
Figure 4:
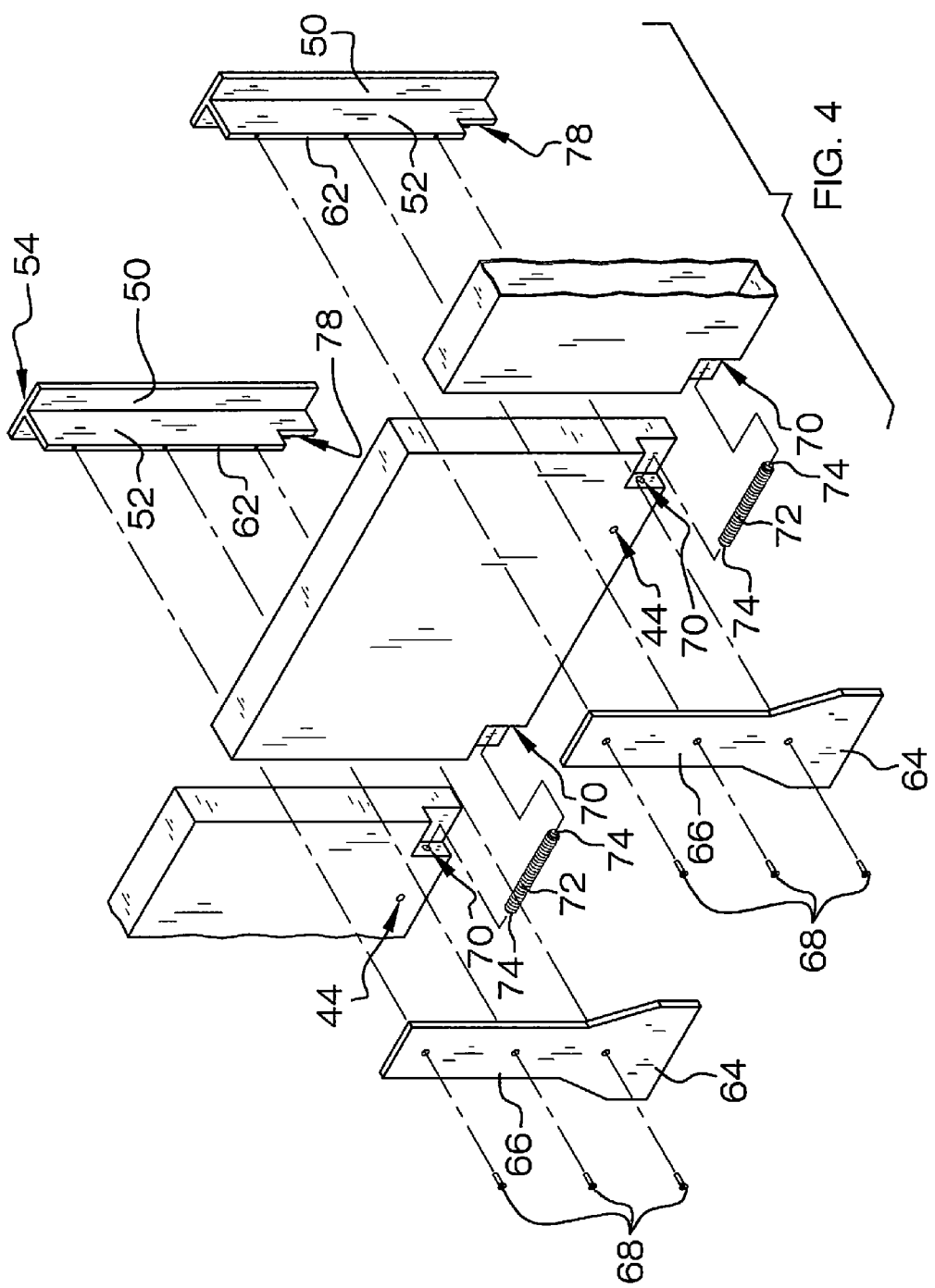
FIG. 4 is an exploded top front side perspective view of an embodiment of the disclosure.
Figure 5:
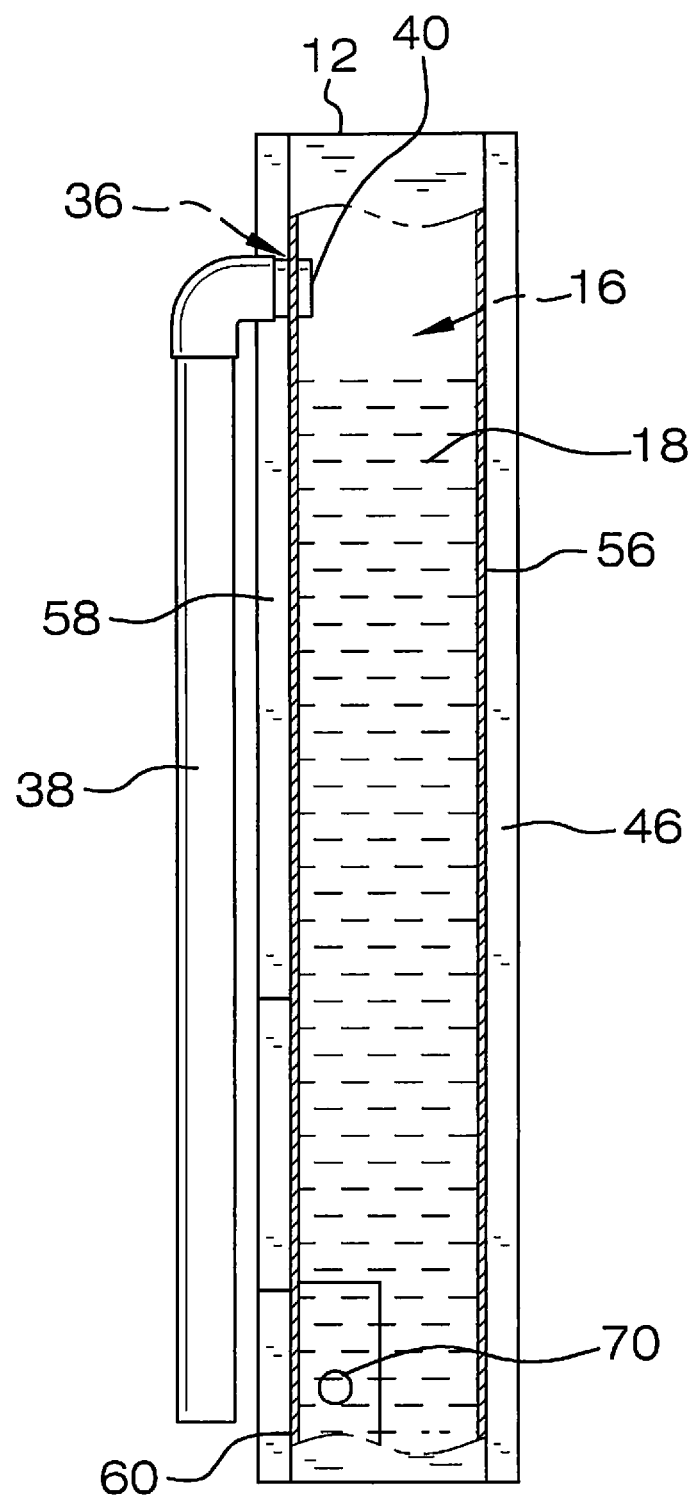
FIG. 5 is a partial cutaway end view of an embodiment of the disclosure.

With reference now to the drawings, and in particular to FIGS. 1 through 5 thereof, a new storage assembly embodying the principles and concepts of an embodiment of the disclosure and generally designated by the reference numeral 10 will be described.

As best illustrated in FIGS. 1 through 5, the water storage fence assembly 10 generally comprises a plurality of panels 12 coupled together to define a storage unit 14. An interior space 16 of the storage unit 14 is configured to receive a fluid 18, such as water or the like, therein. Each of the panels 12 is in fluid communication with an adjacently positioned one of the panels 12 such that the fluid 18 positioned within the interior space 16 of the storage unit 14 flows freely between the panels 12. Each of the panels 12 is spaced from the adjacently positioned one of the panels 12. Each of the panels 12 may be aligned along a longitudinal axis of the storage unit 14. Each of the panels 12 is removably coupled to the adjacently positioned one of the panels 12.

The plurality of panels 12 includes an end panel 20 and a plurality of primary panels 22. A top end 24 of the end panel 20 includes an angled portion 26 and a pair of straight portions 28. The angled portion 26 is coupled to and extends between the straight portions 28. An upper one 30 of the straight portions 28 is aligned with and positioned proximate a top end 32 of an adjacently positioned one of the primary panels 22. The angled portion 26 slants downwardly away from the upper one 30 of the straight portions 28.

An inlet port 34 is positioned in the storage unit 14. The inlet port 34 is configured for coupling to a downspout of a roof such that fluid 18 collected in the downspout is delivered to the interior space 16 of the storage unit 14 through the inlet port 34. In this manner, the fluid 18 drains from the roof and is carried from a rain gutter by the downspout. The inlet port 34 may be positioned in the top end 32 of an associated one of the panels 12. An aperture 36 is positioned in the storage unit 16. A drainage pipe 38 is coupled to storage unit 14. The drainage pipe 38 has a first end 40 extending through and in fluid communication with the aperture 36 such that the drainage pipe 38 is configured for draining excess fluid 18 within the interior space 16 of the storage unit 14.

A pump port 42 is coupled to an associated one of the panels 12. The pump port 42 is configured for coupling to a pump of conventional design. An outlet port 44 is positioned in the storage unit 14. The outlet port 44 is configured for coupling to a valve of an external hose of conventional design such that the outlet port 44 is configured for delivering the fluid 18 to the external hose through the outlet port 44. The outlet port 44 may be one of a plurality of outlet ports 44 wherein each of the panels 12 has an associated one of the outlet ports 44 positioned therein.

A plurality of posts 46 is coupled to the storage unit 14. Each of the posts 46 is positionable between an associated pair of adjacently positioned ones of the panels 12. Each of the posts 46 is configured to extend into a ground surface to secure the storage unit 14 to the ground surface. A plurality of gaps 48 is formed in the storage unit 14 such that each of the gaps 48 is positioned between an associated pair of adjacently positioned ones of the panels 12. Each of the posts 46 has a first planar portion 50 and a second planar portion 52. The second planar portion 52 is coupled to and extends outwardly from a center 54 of the first planar portion 50. The first 50 and second 52 planar portions may be positioned transversely relative to each other. The first planar portion 50 of each of the posts 46 abuts a rear surface 56 of an associated pair of the panels 12. The second planar portion 52 of each of the posts 46 is positionable within an associated one of the gaps 48.

A plurality of post covers 58 is provided. Each of the post covers 58 abuts a front surface 60 of the associated pair of the panels 12. Each of the post covers 58 abuts a distal edge 62 of an associated one of the second planar portions 52 with respect to the first planar portion 50 when an associated one of the post covers 58 is coupled to the storage unit 14. Each of the post covers 58 may be planar. Each of the post covers 58 has a base portion 64 opposite a top portion 66. The base portion 64 of each of the post covers 58 may be wider than the associated top portion 66. A plurality of fasteners 68, such as conventional screws or the like, is provided. Each of the fasteners 68 is extendable into and engages an associated one of the post covers 58 and the distal edge 62 of an associated one of the posts 46 to releasably couple the post cover 58 and the post 46 to the storage unit 14.

A plurality of holes 70 is provided. Each of the panels 12 has at least one of the holes 70 positioned therein wherein each of the holes 70 is positioned to face the adjacently positioned one of the panels 12. A plurality of hoses 72 is provided. Each of the hoses 72 is coupled to and extends between adjacently positioned ones of the holes 70. Opposite ends 74 of each of the hoses 72 extend into and are in fluid communication with associated ones of the holes 70 such that the hoses 72 are configured for transferring the fluid 18 between the panels 12. Each of the hoses 72 may hold between approximately 30.0 mL and 60.0 mL of the fluid 18.

A plurality of grooves 76 is provided. At least one of the grooves 76 extends into each of the panels 12. A plurality of notches 78 is provided. Each of the notches 78 extends into the distal edge 62 of an associated one of the post covers 58. Each of the notches 78 is aligned with an adjacently positioned pair of the grooves 76 when an associated one of the posts 46 is coupled to the storage unit 14. Each of the panels 12, the posts 46 and the post covers 58 may be constructed from plastic, metal or the like. Each of the posts 46 may have a length between approximately 210.0 cm and 260.0 cm.

In use, as stated above and shown in the Figures, the hoses 72 are positioned in the holes 70 so that one hose 72 extends between each of the adjacently positioned panels 12. The posts 46 are then attached to the panels 12 by positioning the second planar portion 52 of each of the posts 46 within an associated one of the gaps 48. The post covers 58 are attached to associated ones of the posts 46 via the fasteners 68. Additional panels 12, posts 46 and post covers 58 are attached as needed to create a desired size for the storage unit 14. The posts 46 are fixed into a ground surface to secure the storage unit 14 to the ground surface. A downspout of a roof is coupled to the inlet port 34 such that fluid 18 collected in the downspout is delivered into the interior space 16 of the storage unit 14. A conventional pump is attached to the pump port 42 and a conventional external hose is coupled to a selectable one of the outlet ports 44 to transfer the fluid 18 outwardly of the interior space 16 of the storage unit 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A water storage fence assembly comprising:
  a plurality of panels coupled together to define a storage unit, an interior space of said storage unit being configured to receive a fluid therein;
  wherein each of said panels is in fluid communication with an adjacently positioned one of said panels such that the fluid positioned within said interior space of said storage unit flows freely between said panels, each of said panels being removably coupled to said adjacently positioned one of said panels;
  a plurality of posts coupled to said storage unit, each of said posts being positionable between an associated pair of adjacently positioned ones of said panels;
  a plurality of gaps, each of said gaps being positioned between an associated pair of adjacently positioned ones of said panels;
  each of said posts having a first planar portion and a second planar portion, said second planar portion being coupled to and extending outwardly from a center of said first planar portion, said first and second planar portions being positioned transversely relative to each other, said first planar portion of each of said posts abutting a rear surface of an associated pair of said panels, said second planar portion of each of said posts being positionable within an associated one of said gaps;
  a plurality of post covers, each of said post covers abutting a front surface of said associated pair of said panels, each of said post covers abutting a distal edge of an associated one of said second planar portions with respect to said first planar portion when an associated one of said post covers is coupled to said storage unit;
  a plurality of grooves, at least one of said grooves extending into each of said panels; and
  a plurality of notches, each of said notches extending into said distal edge of an associated one of said post covers, each of said notches being aligned with an adjacently positioned pair of said grooves when an associated one of said posts is coupled to said storage unit.

2. The assembly of claim 1, further comprising an inlet port positioned in said storage unit, said inlet port being configured for coupling to a downspout of a roof such that fluid collected in the downspout is delivered to said interior space of said storage unit through said inlet port.

3. The assembly of claim 2, further comprising said inlet port being positioned in a top end of an associated one of said panels.

4. The assembly of claim 1, further comprising:
  an aperture being positioned in said storage unit; and
  a drainage pipe being coupled to storage unit, said drainage pipe having a first end extending through and in fluid communication with said aperture such that said drainage pipe is configured for draining excess fluid within said interior space of said storage unit.

5. The assembly of claim 1, further comprising a pump port being coupled to an associated one of said panels, said pump port being configured for coupling to a pump.

6. The assembly of claim 1, further comprising an outlet port positioned in said storage unit, said outlet port being configured for coupling to an external hose such that said outlet port is configured for delivering the fluid to the external hose through said outlet port.

7. The assembly of claim 6, further comprising said outlet port being one of a plurality of said outlet ports, each of said panels having an associated one of said outlet ports positioned therein.

8. The assembly of claim 1, further comprising each of said panels being spaced from said adjacently positioned one of said panels.

9. The assembly of claim 1, further comprising each of said panels being aligned along a longitudinal axis of said storage unit.

10. The assembly of claim 1, further comprising each of said post covers being planar.

11. The assembly of claim 1, further comprising each of said post covers having a base portion opposite a top portion, said base portion of each of said post covers being wider than said associated top portion.

12. The assembly of claim 1, further comprising a plurality of fasteners, each of said fasteners being extendable into and engaging an associated one of said post covers and said distal edge of an associated one of said posts to releasably couple said post cover and said post to said storage unit.

13. The assembly of claim 1, further comprising wherein said plurality of panels includes an end panel and a plurality of primary panels, a top of said end panel including an angled portion and a pair of straight portions, said angled portion being coupled to and extending between said straight portions, an upper one of said straight portions being aligned with and positioned proximate a top end of an adjacently positioned one of said primary panels, said angled portion slanting downwardly away from said upper one of said straight portions.

14. The assembly of claim 1, further comprising:
a plurality of holes, each of said panels having at least one of said holes positioned therein wherein each of said holes is positioned to face said adjacently positioned one of said panels; and
a plurality of hoses, each of said hoses being coupled to and extending between adjacently positioned ones of said holes, opposite ends of each of said hoses extending into and being in fluid communication with associated ones of said holes such that said hoses are configured for transferring the fluid between said panels.

15. A water storage fence assembly comprising:
a plurality of panels coupled together to define a storage unit, an interior space of said storage unit being configured to receive a fluid therein, each of said panels being in fluid communication with an adjacently positioned one of said panels such that the fluid positioned within said interior space of said storage unit flows freely between said panels, each of said panels being spaced from said adjacently positioned one of said panels, each of said panels being aligned along a longitudinal axis of said storage unit, each of said panels being removably coupled to said adjacently positioned one of said panels;
an inlet port positioned in said storage unit, said inlet port being configured for coupling to a downspout of a roof such that fluid collected in the downspout is delivered to said interior space of said storage unit through said inlet port, said inlet port being positioned in a top end of an associated one of said panels;
an aperture being positioned in said storage unit;
a drainage pipe being coupled to storage unit, said drainage pipe having a first end extending through and in fluid communication with said aperture such that said drainage pipe is configured for draining excess fluid within said interior space of said storage unit;
a pump port being coupled to an associated one of said panels, said pump port being configured for coupling to a pump;
an outlet port positioned in said storage unit, said outlet port being configured for coupling to an external hose such that said outlet port is configured for delivering the fluid to the external hose through said outlet port, said outlet port being one of a plurality of said outlet ports, each of said panels having an associated one of said outlet ports positioned therein;
a plurality of posts coupled to said storage unit, each of said posts being positionable between an associated pair of adjacently positioned ones of said panels;
a plurality of gaps, each of said gaps being positioned between an associated pair of adjacently positioned ones of said panels;
each of said posts having a first planar portion and a second planar portion, said second planar portion being coupled to and extending outwardly from a center of said first planar portion, said first and second planar portions being positioned transversely relative to each other, said first planar portion of each of said posts abutting a rear surface of an associated pair of said panels, said second planar portion of each of said posts being positionable within an associated one of said gaps;
a plurality of post covers, each of said post covers abutting a front surface of said associated pair of said panels, each of said post covers abutting a distal edge of an associated one of said second planar portions with respect to said first planar portion when an associated one of said post covers is coupled to said storage unit, each of said post covers being planar, each of said post covers having a base portion opposite a top portion, said base portion of each of said post covers being wider than said associated top portion;
a plurality of fasteners, each of said fasteners being extendable into and engaging an associated one of said post covers and said distal edge of an associated one of said posts to releasably couple said post cover and said post to said storage unit;
wherein said plurality of panels includes an end panel and a plurality of primary panels, a top of said end panel including an angled portion and a pair of straight portions, said angled portion being coupled to and extending between said straight portions, an upper one of said straight portions being aligned with and positioned proximate a top end of an adjacently positioned one of said primary panels, said angled portion slanting downwardly away from said upper one of said straight portions;
a plurality of holes, each of said panels having at least one of said holes positioned therein wherein each of said holes is positioned to face said adjacently positioned one of said panels;
a plurality of hoses, each of said hoses being coupled to and extending between adjacently positioned ones of said holes, opposite ends of each of said hoses extending into and being in fluid communication with associated ones of said holes such that said hoses are configured for transferring the fluid between said panels;
a plurality of grooves, at least one of said grooves extending into each of said panels; and
a plurality of notches, each of said notches extending into said distal edge of an associated one of said post covers, each of said notches being aligned with an adjacently positioned pair of said grooves when an associated one of said posts is coupled to said storage unit.

* * * * *